Aug. 19, 1958         T. GEORGI         2,848,244

STEERABLE AXLE ASSEMBLY FOR MOTOR VEHICLE TRAILERS

Filed May 16, 1956         5 Sheets-Sheet 1

INVENTOR.
THEODOR GEORGI

BY HIS ATTORNEYS.
HARRIS, KIECH, FOSTER & HARRIS

Aug. 19, 1958 T. GEORGI 2,848,244
STEERABLE AXLE ASSEMBLY FOR MOTOR VEHICLE TRAILERS
Filed May 16, 1956 5 Sheets-Sheet 2

INVENTOR.
THEODOR GEORGI

BY HIS ATTORNEYS.
HARRIS, KIECH, FOSTER & HARRIS

Aug. 19, 1958 T. GEORGI 2,848,244
STEERABLE AXLE ASSEMBLY FOR MOTOR VEHICLE TRAILERS
Filed May 16, 1956 5 Sheets-Sheet 3

INVENTOR.
THEODOR GEORGI

BY HIS ATTORNEYS.
HARRIS, KIECH, FOSTER & HARRIS

Aug. 19, 1958  T. GEORGI  2,848,244
STEERABLE AXLE ASSEMBLY FOR MOTOR VEHICLE TRAILERS
Filed May 16, 1956  5 Sheets-Sheet 4
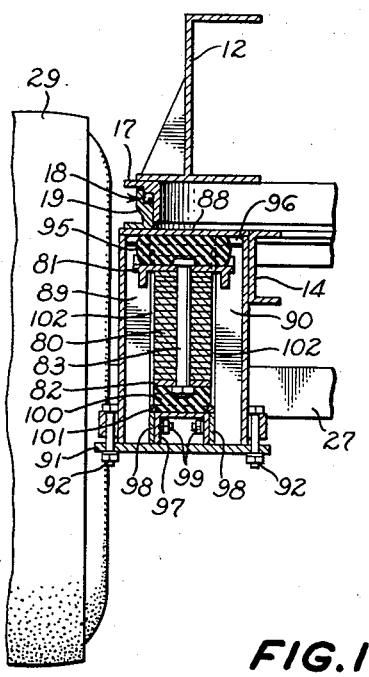
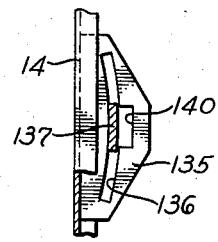
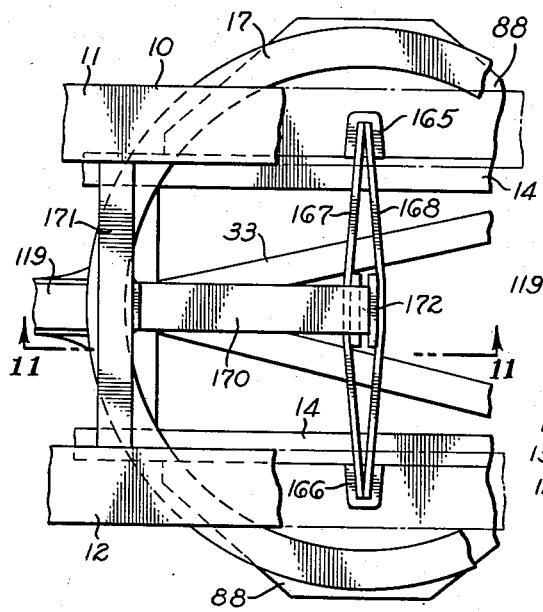
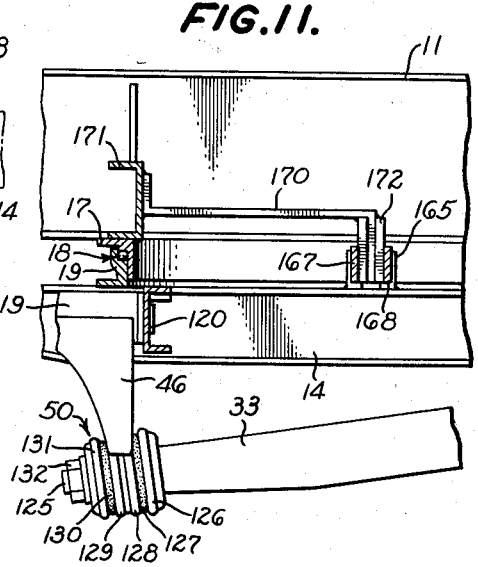
INVENTOR.
THEODOR GEORGI
BY HIS ATTORNEYS.
HARRIS, KIECH, FOSTER & HARRIS Aug. 19, 1958 T. GEORGI 2,848,244
STEERABLE AXLE ASSEMBLY FOR MOTOR VEHICLE TRAILERS
Filed May 16, 1956 5 Sheets-Sheet 5

INVENTOR.
THEODOR GEORGI

BY HIS ATTORNEYS.
HARRIS, KIECH, FOSTER & HARRIS

United States Patent Office 2,848,244
Patented Aug. 19, 1958

2,848,244

STEERABLE AXLE ASSEMBLY FOR MOTOR VEHICLE TRAILERS

Theodor Georgi, Hilden, Germany, assignor to American European Engineering Corporation, Santa Barbara, Calif., a corporation of California Application May 16, 1956, Serial No. 585,226

Claims priority, application Germany September 7, 1955

12 Claims. (Cl. 280—81)

This invention relates to trailers adapted for use with motor vehicles or the like and in particular to automatic steering devices for vehicular trailers.

When the operator of a conventional tractor and trailer combination is negotiating a turn, the towing vehicle must be steered along a path different from that used with a typical passenger automobile. This difference in steering paths is required because the rear wheels of the long tractor-trailer combination do not follow the paths of the front wheels but deviate considerably therefrom. Because of such deviation, the turns which may be negotiated by the long vehicles must be less sharp than those which are maneuverable by a shorter vehicle. Such disadvantages have been overcome in the construction of long fire-fighting equipment where the rear wheels of the vehicle are independently and manually steered.

It is an object of this invention to provide a device for automatically steering the rear axle of a long vehicle such as a trailer so that the rear wheels will follow substantially the same path as the forward wheels.

It is another object of the invention to provide a device for automatically steering one or more of the rear axles of a long vehicle such as a trailer having dual rear axles so that the rear wheels will follow substantially the same path as the forward wheels.

It is another object of the invention to provide an automatic steering device for a trailer or the like in which the bed of the trailer is rotatably mounted on a frame which in turn rests on one or more axles and in which a mechanism carried by the frame rotates one of said axles relative to the frame in response to rotation of the bed relative to the frame.

It is another object of the invention to provide an automatic steering device which may be adapted for use with various sizes of vehicles, the steering ratio being controlled by providing adjustment for the length of one or more of the links in the steering system.

It is a further object of the invention to provide an automatic steering device for a trailer or the like which is adapted to be used for both forward and reverse motion of the vehicle. Another object of the invention is to provide such a steering device with which the trailer may be steered automatically while moving in the reverse direction. A further object of the invention is to provide such a steering device having remotely controlled means for blocking the automatic steering operation and locking the axle, frame and trailer together so that the vehicle may be operated as a conventional trailer in the forward or reverse direction.

It is also an object of the invention to provide an automatic steering device for a trailer having a stabilizing system for normally maintaining the vehicle in the straight ahead direction and absorbing shock due to rough roads and uneven braking forces. A further object of the invention is to provide such a stabilizing system in which the stabilizing force may be varied as a function of the braking force to increase the stability during braking.

The invention also comprises novel details of construction and novel combinations and arrangements of parts, which will more fully appear in the course of the following description. The drawings merely show and the description merely describes preferred embodiments of the present invention which are given by way of illustration or example.

In the drawings, which are diagrammatic representations of the invention:

Fig. 7 is a sectional view taken along the line 7—7 of Fig. 6;

Fig. 8 is a sectional view taken along the line 8—8 of Fig. 5;

Fig. 9 is a sectional view taken along the line 9—9 of Fig. 6;

Fig. 10 is a partial sectional view similar to Fig. 6, showing another form of the invention;

Fig. 11 is a sectional view taken along the line 11—11 of Fig. 10;

Figure 1:
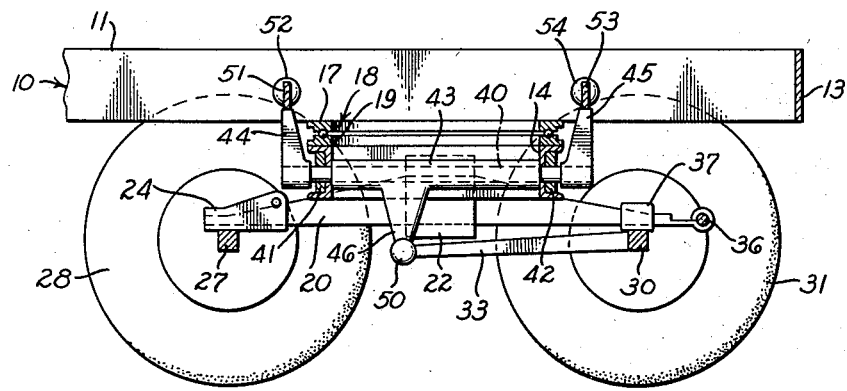
Fig. 1 is a vertical sectional view of a preferred embodiment of the invention with the vehicle moving along a straight path.
Figure 2:
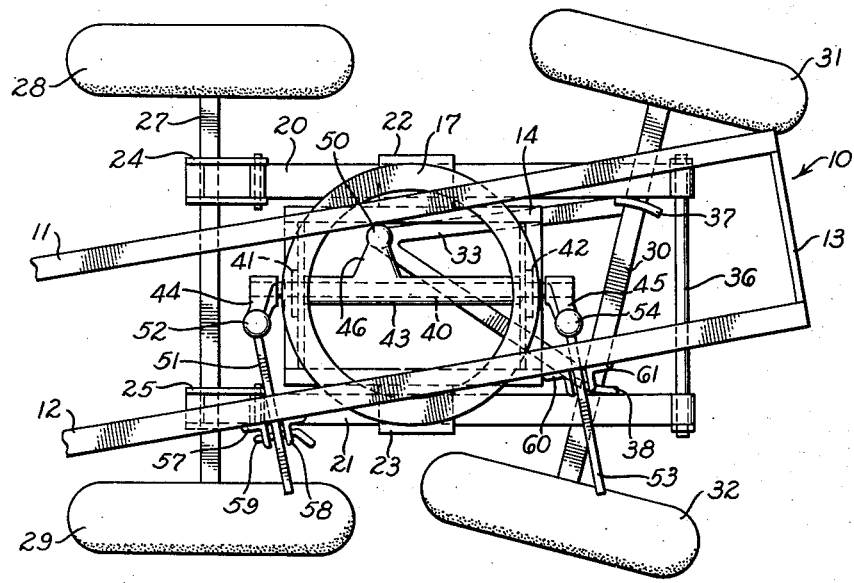
Fig. 2 is a top view of the embodiment of Fig. 1 with the vehicle turning to the left.

In the embodiment of Figs. 1 and 2, the rear portion of a bed 10 of a trailer is shown composed of side rails 11, 12 and an end rail 13, the forward portion of the bed not being shown. The bed 10 is supported by a rectangular frame 14, the upper portion 17 of a bearing structure 18 being carried by the bed 10 and engaging a lower portion 19 of the bearing structure carried by the frame 14, permitting rotation of the bed in a horizontal plane relative to the frame.

The frame 14 is carried between side members 20, 21, which may be multiple leaf springs, and which are mounted on the frame by blocks 22, 23 respectively. Axle support brackets 24, 25 are positioned at the forward ends of the side members 20, 21 respectively, an axle 27 being attached to the axle support brackets by suitable means such as welding. Wheels 28, 29 are mounted at respective ends of the axle 27.

A second axle 30, having wheels 31, 32 mounted at the respective ends thereof, is provided with a steering tongue 33, rigidly fixed thereto and extending forward therefrom in a generally triangular form. The rear ends of the side members 20, 21 are joined by a rod 36, the side members being shown as resting on the axle 30 and being positioned relative thereto by curved upstanding brackets 37, 38 fixed to the axle and engaging the side members. This structure permits the axle 30 to be rotated in a horizontal plane relative to the frame 14 and side members 20, 21.

A lever system is provided for rotating the axle 30 relative to the frame 14 when the bed 10 is rotated relative to the frame 14. The lever system of the embodiment of Figs. 1 and 2 includes a shaft 40 which is rotatably mounted in bearings 41, 42 fixed to the forward and rear portions of the frame 14. A sleeve 43 is fixed to the shaft 40 between the forward and rear portions of the frame 14 so that the sleeve and shaft will rotate together. One end of the shaft 40 extends forward of the bearing 41 and a crank arm 44 is mounted thereon. The other end of the shaft extends rearward of the bearing 42 and a second crank arm 45 is mounted thereon. A third crank arm 46 is mounted on the sleeve 43 on the side thereof opposite the crank arms 44 and 45, the outer end of the crank arm 46 being articulatedly joined to the forward end of the steering tongue 33 at a joint 50.

One end of a shaft 51 is articulatedly coupled to the outer end of the crank arm 44 at a joint 52, the shaft 51 passing through an opening in the side rail 12. A second shaft 53 is articulatedly coupled to the outer end of the crank arm 45 at a joint 54, the shaft passing through an opening in the side rail 12. A pinlock consisting of brackets 57, 58 and a pin 59 is provided on the side rail 12, the shaft passing between the brackets, and the pin passing through aligned openings in the shaft and the brackets. Similar brackets 60, 61 are provided on the side rail adjacent the shaft 53 for fixing the shaft relative to the side rail. Since only one of the shafts 51 or 53 is fixed to the side rail at any time, only one pin is provided.

In Figs. 1 and 2, the forward end of the vehicle extends to the left of the drawing and the vehicle is considered to be moving in the forward direction. When a left turn is being made, as shown in Fig. 2, the bed 10 is rotated counterclockwise relative to the frame 14 producing a rotation of the shaft 40 via the shaft 51 and the crank arm 44. Therefore, the crank arm 46 is also rotated and moves the steering tongue 33 in a clockwise direction, positioning the axle 30 at the desired angle so that the rear wheels 31, 32 will follow substantially the same path as the forward wheels.

If it is desired to move the vehicle in the reverse direction, the pin 59 is removed from the position shown in Fig. 2, thereby freeing the shaft 51, and is inserted in aligned openings in the shaft 53 and brackets 60, 61. Then the axle 30 will be rotated relative to the frame 14 in the same direction that the bed 10 is rotated relative to the frame 14, which is the desired relationship when moving the vehicle in the reversed direction.

While the embodiment of the invention described above is a double axle assembly, it should be noted that the invention is equally applicable to single axle assemblies wherein the forward axle 27 would be omitted and the frame 14 supported by the rear axle 30 only. The structure of the invention disclosed may also be varied to rotate the forward of the two rear axles if desired.

While the specific embodiments of the invention described herein will ordinarily be used to support and steer the rear end of the trailer in a long tractor-trailer combination, the double axle assembly may also be used to support and steer the rear end of a single vehicle having manually steered front wheels.

Figure 3:
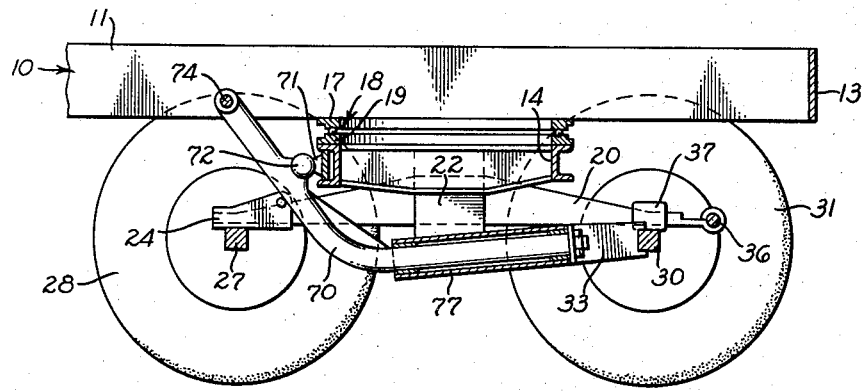
Fig. 3 is a vertical sectional view of an alternative embodiment of the invention with the vehicle moving along a straight path.
Figure 4:
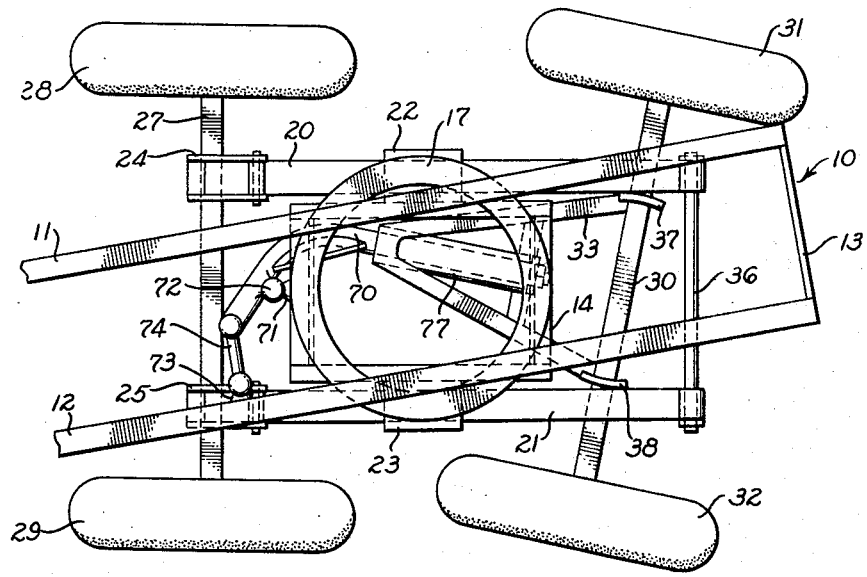
Fig. 4 is a top view of the embodiment of Fig. 3 with the vehicle turning to the left.

An alternative embodiment of the invention is shown in Figs. 3 and 4, this embodiment differing from that of Figs. 1 and 2 in the lever system used to transfer the rotation of the bed 10 to the axle 30. Identical parts in the two embodiments are indicated by the same reference numerals. A bar 70 is pivotally mounted on a boss 71 at a joint 72, the boss 71 being mounted on and extending forward from the frame 14. A boss 73 is mounted on the inner side of the side rail 12 and projects inward therefrom, the forward end of the bar 70 and the boss 73 being articulatedly coupled by a link 74.

The rear end of the bar 70 is telescopingly mounted in a tube 77 carried by the steering tongue 33. When the bed 10 of the vehicle is turned to the left as shown in Fig. 4, the bar 70 will be pivoted about the boss 71, the link 74 fixing the forward end of the bar 70 relative to the side rail 12 so that the steering tongue is moved in a clockwise direction, positioning the wheels in the same manner as in the embodiment of Figs. 1 and 2.

Figure 5:
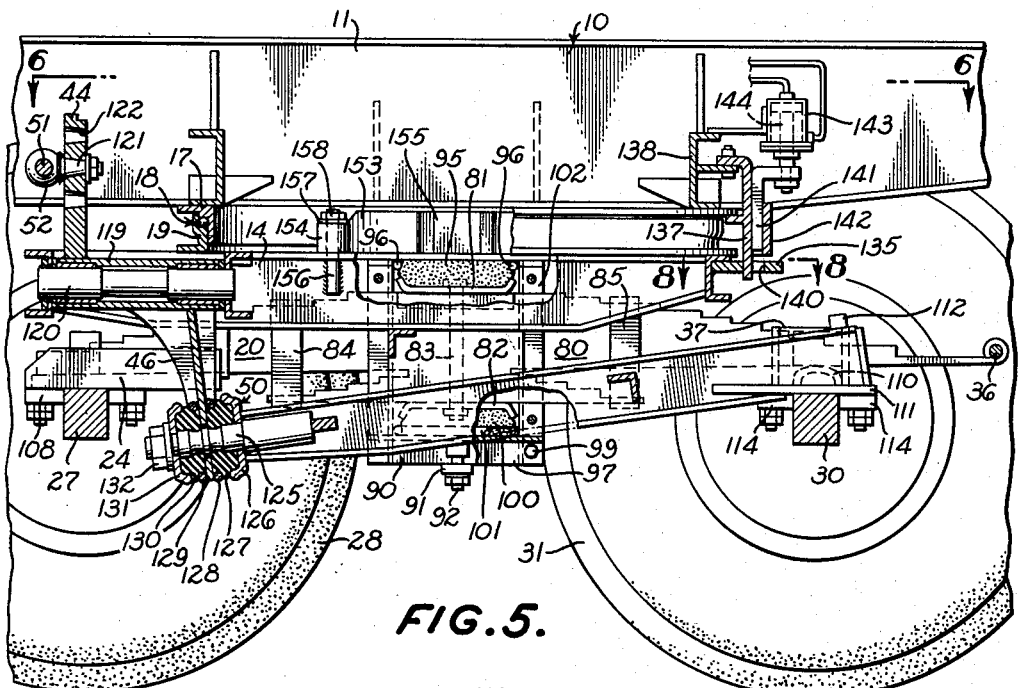
Fig. 5 is a vertical sectional view of another alternative embodiment of the invention.
Figure 6:
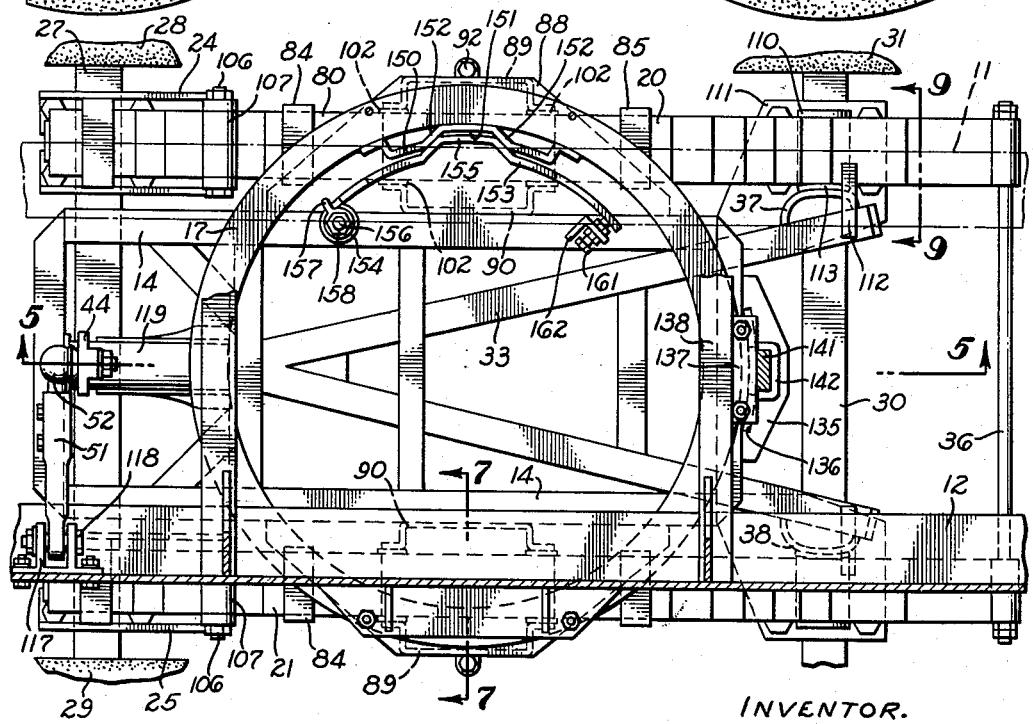
Fig. 6 is a sectional view taken along the line 6—6 of Fig. 5.

In the embodiment of Figs. 5 and 6, the invention is shown in greater detail and further modifications are illustrated. The same reference numerals indicate the same parts as in the other embodiments. Each of the side members 20 and 21 consists of a plurality of leaf springs 80 stacked vertically and clamped together by an upper plate 81, a lower plate 82 and a bolt 83 and by bands 84 and 85. Each side member is carried in a box fixed to the frame 14, the box consisting of a top 88, sides 89, 90 and a bottom bridge 91 suspended from the sides by bolts 92. A rubber cushion 95 is positioned between the upper plate 81 and the top 88, the cushion being retained between upturned ends of the upper plate and rods 96 fixed to the top 88. A downwardly opening channel 97 with vertical spacer plates 98 on each side thereof is fixed between the sides 89, 90 by bolts 99, the lower plate 82 being spaced above the channel 97 by a rubber cushion 100 seated in a ring 101 carried by the channel. Two vertically disposed rubbing plates 102 are riveted to each of the sides 89, 90 to contact the leaf springs 80 and space the sides therefrom.

The form of support for the side members 20 and 21 described above permits the side members to oscillate about a horizontal transverse axis but prevents motion about a vertical axis and a horizontal longitudinal axis, thereby providing equalization of loading among the axles.

The axle support brackets 24 and 25 on which the forward ends of the side members 20 and 21 rest, are coupled to the respective side members 20 and 21 by means of bolts 106 passing through the support brackets and through rolled over ends 107 of one of the leaf springs 80. Four plates 108 are fixed to the axle 27 by suitable means, such as welding or integral forging, and are bolted to the axle support brackets 24 and 25, thereby fixing the axle to the side members.

The rear portion of each of the stacks of leaf springs 80 rests on a slide bracket 110 which projects upward from a plate 111 fixed to the steering tongue 33, upward motion of the spring stack being restrained by a pin 112 which projects outward from the steering tongue over the spring stack. Each of the curved upstanding brackets 37 and 38 is provided with a rubbing plate 113 for engaging the side of the spring stack. Ears 114 are fixed to the axle 30 and bolted to the plates 111 to fix the axle to the steering tongue.

The embodiment of Figs. 5 and 6 is designed for automatic steering only when moving in the forward direction, i. e., to the left as viewed in Figs. 5 and 6. The bed 10 of the trailer is coupled to the steering tongue 33 through the shaft 51 which is pivotally mounted to the bed by a U-bracket 117 and bolt 118, the joint 52, the crank arm 44, the crank arm 46 and the joint 50, the crank arms being mounted on a shaft 119 which is rotatably mounted on a pin 120 fixed in the forward end of the rectangular frame 14. An end 121 of the joint 52 is adapted to be engaged with any one of a plurality of openings 122 in the crank arm 44 thus providing an adjustment for the steering ratio. The joint 50 includes a pin 125 and a retainer plate 126, a cushion 127, a ring 128, a second ring 129, a second cushion 130 and a second retainer plate 131 clamped to the pin 125 by a nut 132 with the crank arm 46 positioned on the pin between the cushions, the rings being positioned around circumferential grooves in the pin to force the cushions into the grooves.

When desired, the movement of the frame 14 relative to the bed 10 may be restricted to limit the turning of the steered axle 30. Such limiting may be accomplished by a horizontally disposed plate 135 fixed to the frame 14 and having an arcuate slot 136 therein. A tongue 137 is mounted on a cross member 138 of the bed 10 with a portion of the tongue positioned within the slot 136 so that rotation of the bed in a horizontal plane moves the tongue along the slot, the engagement of the tongue with either end of the slot limiting the relative motion of the bed and frame.

When the embodiment of Figs. 5 and 6 is operated in the reverse direction, the frame may be fixed relative to the bed so that no automatic steering occurs. This may be accomplished by providing an opening 140 in the plate 135 and a pin 141 slidably carried in a guide 142 on the tongue 137, the pin 141 being positionable in the opening 140 to prevent relative motion of the bed and frame. Means for moving the pin into and out of the opening may comprise a hydraulic or pneumatic cylinder 143 and a piston 144 which is actuated by a valve positioned in the cab of the vehicle.

Since the steerable axle 30 is not fixed relative to the bed 10 when the vehicle is in normal operation, it is often desirable to provide means for maintaining the axle in proper alignment to prevent oscillation of the frame relative to the bed and to prevent weaving or whipping of the rear end of the trailer which may be initiated by rough road surfaces and uneven braking forces. This may be accomplished by providing a flexible structure coupling the bed to the frame and producing a force which tends to maintain the unit in a centered position. In Figs. 5 and 6, a buffer plate 150 having a central depressed portion 151 with outwardly extending walls 152 is fixed to the inner surface of the upper portion 17 of the bearing structure 18. An arcuate arm 153 having a loop 154 formed at one end thereof is provided with an extended central portion 155 corresponding to the depressed central portion 151, the extended portion 155 being engageable with the walls 152. The arm 153 is mounted on the frame 14 with the loop 154 passing over a vertical pin 156 and being retained thereon by a plate 157 and nut 158. An adjustment screw 161 is carried in a bracket 162 mounted on the frame 14, the screw being engageable with the end of the arm 153 opposite the loop to urge the arm into engagement with the buffer plate 150.

The engagement of the arm and buffer plate tends to maintain the bed and frame fixed relative to one another since, in order for the bed to rotate relative to the frame, it is necessary that a torque sufficient to flex the arm 153 be applied by the bed.

In Figs. 10 and 11, an alternate form for producing the axle aligning force is shown. Pockets 165 and 166 are mounted on the tops 88 which extend from each side of the frame 14, with open ends of the pockets facing each other. Two flexible plates or springs 167, 168 are positioned side-by-side in the pockets, extending laterally across the frame 14 and preferably being prestressed to urge the plates toward each other. An arm 170 projects from across member 171 of the bed 10 with one end of the arm terminating adjacent the center of the plates 167, 168. Two spacer plates 172 are fixed to the end of the arm 170 and positioned between the flexible plates 167, 168, moving them from their normal side-by-side position. The arms of the spacer plate 172 extend substantially parallel to the flexible plates 167, 168 for a short distance, so that when the bed 10 is rotated in a horizontal plane relative to the frame 14, the spacer plate forces the flexible plates further away from each other. The amount of centering force provided by this structure can be controlled by varying the relative sizes of the components and the elastic properties of the flexible plates.

Figure 12:
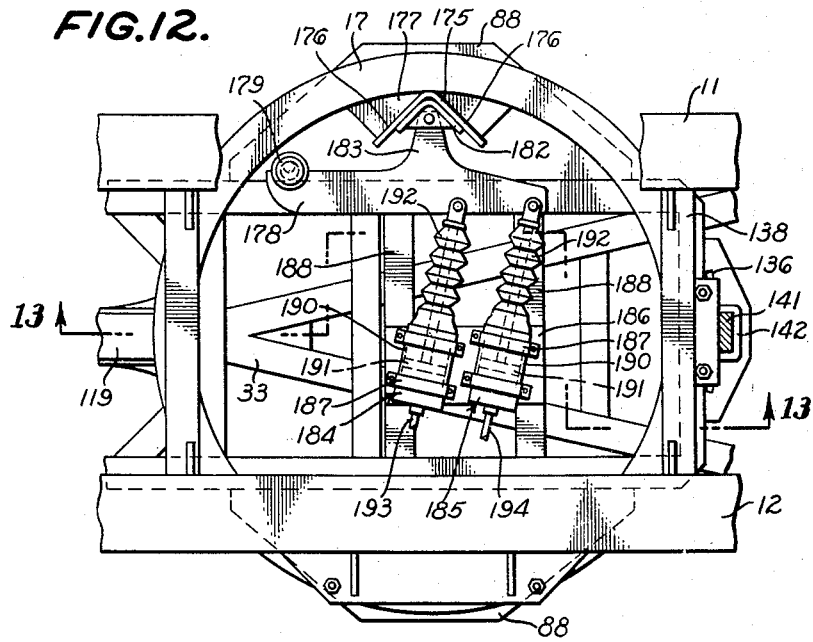
Fig. 12 is a partial sectional view similar to Fig. 6, showing another form of the invention.
Figure 13:
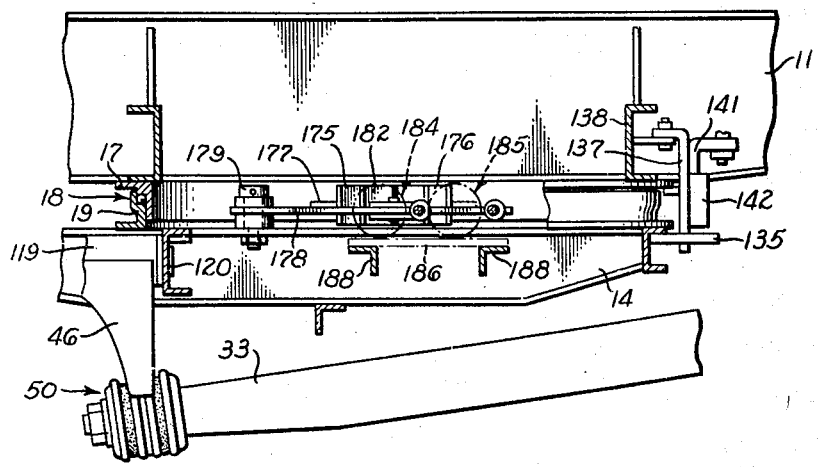
Fig. 13 is a sectional view taken along the line 13—13 of Fig. 12.

Long tractor-trailer combinations tend to jackknife, i. e., the rear end swings around and tends to catch up with the front end, when braking, especially on down grades. Another form for producing the axle aligning force which is especially adapted to preventing jackknifing is shown in Figs. 12 and 13. Therein, a buffer plate 175, which is substantially V-shaped with outward extending walls 176, is fixed to the inner surface of the upper portion 17 of the bearing structure 18 by a plate 177. An arm 178 is pivotally mounted on a pin 179 which in turn is fixed to the top 88 carried by the frame 14. The pin 179 is rotatable relative to the top 88 with the axis of rotation of the pin in the top being parallel to and spaced from the axis of rotation of the arm about the pin, providing means for shifting the axis of rotation of the arm relative to the frame.

A rubbing shoe 182 having a contour corresponding to the buffer plate 175 is pivotally mounted on an extension 183 of the arm 178 so that the shoe may engage one or both of the walls 176 of the buffer plate.

Fluid pressure units 184 and 185 are clamped to a plate 186 by straps 187, the plate 186 being fixed to the frame 14 by angles 188 carried by the frame. Each of the fluid pressure units consists of a cylinder 190, a piston 191 slidably positioned in the cylinder and a flexible jacket 192 covering the exposed portion of the piston, one end of each piston being connected to the arm 178. Lines 193, 194 are provided to transmit fluid under pressure to the units 184, 185, respectively.

During normal operation of the vehicle, fluid under pressure will be admitted to one of the pressure units, for example, the unit 184. The pressure unit will exert a force tending to maintain the shoe 182 in engagement with the buffer plate 175; however, this force should not be so great that it cannot be overcome when the vehicle is being steered around a turn. When it is desired to prevent rotation of the rear axles under any circumstance, such as during braking, fluid under pressure is also admitted to the second unit, here the unit 185. The resulting combination of forces can be made so great that the frame 14 does not move relative to the bed of the trailer. If desired, the admission of fluid to the second pressure unit may be controlled by the brake lever of the towing vehicle so that the additional stabilizing force is automatically applied when the brakes are applied.

It is, of course, possible to utilize only a single pressure unit and still maintain the advantage of applying a variable force by varying the pressure of the fluid admitted to the cylinder of the pressure unit.

Although exemplary embodiments of the invention have been disclosed and discussed, it will be understood other applications of the invention are possible and that the embodiments disclosed may be subjected to various changes, modifications and substitutions without necessarily departing from the spirit of the invention.

I claim as my invention:

1. In an automatic steering device for a vehicular trailer having a bed, the combination of: a frame for supporting the bed of the trailer, said frame being rotatable in a horizontal plane relative to the bed; an axle assembly for supporting one end of said frame, said axle assembly being rotatable in a horizontal plane relative to said frame; means carried by said frame for supporting the other end of said frame; and lever means having a first extension coupled to the bed at a first level and a second extension coupled to said axle assembly, said lever means being pivotally fixed to said frame at a second level vertically displaced from said first level for rotation about a generally fore-and-aft axis and rotating said axle assembly relative to said frame as a function of the rotation of the bed relative to said frame whereby said axle assembly is steered in response to turning of the trailer.

2. In an automatic steering device for a vehicular trailer having a bed, the combination of: a frame for supporting the bed of the trailer, said frame being rotatable in a horizontal plane relative to the bed; an axle assembly for supporting said frame, said axle assembly being rotatable in a horizontal plane relative to said frame; and a shaft mounted in said frame, said shaft lying in a substantially horizontal plane and being rotatable about the longitudinal axis of said frame, said shaft having a first crank arm coupled to the bed and a second crank arm coupled to said axle assembly producing rotation of said axle assembly relative to said frame when the bed is rotated relative to said frame.

3. In an automatic steering device for a vehicular trailer having a bed, the combination of: a frame for supporting the bed of the trailer, said frame being rotatable in a horizontal plane relative to the bed; an axle assembly for supporting one end of said frame, said axle assembly being rotatable in a horizontal plane relative to said frame; means carried by said frame for supporting the other end of said frame; a bar pivotally fixed to said frame at a second level for rotation about a generally fore-and-aft axis, one end of said bar telescopingly engaging said axle assembly in steering relationship; and means for coupling the other end of said bar to the bed at a first level vertically displaced from said second level producing rotation of said axle assembly relative to said frame when the bed is rotated relative to said frame.

4. In an automatic steering device for a vehicular trailer having a bed, the combination of: a frame for supporting the bed of the trailer, said frame being rotatable in a horizontal plane relative to the bed; an axle assembly for supporting one end of said frame, said axle assembly being rotatable in a horizontal plane relative to said frame; means carried by said frame for supporting the other end of said frame; lever means pivotally fixed to said frame at a second level for rotation about a generally fore-and-aft axis, said lever means having a first extension adapted to be coupled to said bed at a first level vertically displaced from said second level and forward of the center of rotation of said frame about the bed, a second extension adapted to be coupled to the bed aft of the center of rotation of said frame about the bed, and a third extension coupled to said axle assembly; means for coupling said first extension to the bed in driving relationship; and means for coupling said second extension to the bed in driving relationship.

5. In an automatic steering device for a vehicular trailer having a bed member, the combination of: a frame member for supporting the bed member of the trailer, said frame member being rotatable in a horizontal plane relative to the bed member; an axle assembly for supporting said frame member, said axle assembly being rotatable in a horizontal plane relative to said frame member; lever means having a first extension coupled to the bed member and a second extension coupled to said axle assembly, said lever means being pivotally fixed to said frame member and rotating said axle assembly relative to said frame member as a function of the rotation of the bed member relative to said frame member whereby said axle assembly is steered in response to the turning of the trailer; and means for fixing said frame member relative to the bed member to prevent movement of said axle assembly relative to said frame member, said means including an apertured plate carried by one of said members, a pin carried by the other of said members and means for moving said pin and plate into engagement.

6. In an automatic steering device for a vehicular trailer having a bed, the combination of: a frame for supporting the bed of the trailer, said frame being rotatable in a horizontal plane relative to the bed; and axle assembly for supporting said frame, said axle assembly being rotatable in a horizontal plane relative to said frame; lever means having a first extension coupled to the bed and a second extension coupled to said axle assembly, said lever means being pivotally fixed to said frame and rotating said axle assembly relative to said frame as a function of the rotation of the bed relative to said frame whereby said axle assembly is steered in response to turning of the trailer; an apertured plate mounted on said frame; a pin carried by the bed and movable relative thereto to engage said plate; and a remotely controlled piston carried by the bed for moving said pin toward and away from said plate.

7. In an automatic steering device for a vehicular trailer having a bed member, the combination of: a frame member for supporting the bed member of the trailer, said frame member being rotatable in a horizontal plane relative to the bed member; an axle assembly for supporting said frame member, said axle assembly being rotatable in a horizontal plane relative to said frame member; lever means pivotally fixed to said frame member for rotating said axle assembly relative to said frame member as a function of the rotation of the bed member relative to said frame member whereby said axle assembly is steered in response to the turning of the trailer; and stabilizing means including a first element carried by one of said members and engageable with a second element carried by the other of said members for producing a force tending to maintain said members in a predetermined angular relation.

8. In an automatic steering device for a vehicular trailer having a bed member, the combination of: a frame member for supporting the bed member of the trailer, said frame member being rotatable in a horizontal plane relative to the bed member; an axle assembly for supporting said frame member, said axle assembly being rotatable in a horizontal plane relative to said frame member; lever means pivotally fixed to said frame member for rotating said axle assembly relative to said frame member as a function of the rotation of the bed member relative to said frame member whereby said axle assembly is steered in response to turning of the trailer; a buffer plate mounted on one of the members, said buffer plate having a central depression with outwardly extending walls; an arm carried on the other of the members, said arm having an extending portion corresponding to said central depression and engageable with said walls thereof; and means mounted on said other member for urging said arm and plate into engagement.

9. In an automatic steering device for a vehicular trailer having a bed member, the combination of: a frame member for supporting the bed member of the trailer, said frame member being rotatable in a horizontal plane relative to the bed member, one of the members including opposed pockets facing each other; an axle assembly for supporting one end of said frame member, said axle assembly being rotatable in a horizontal plane relative to said frame member; means carried by said frame member for supporting the other end of said frame member; lever means having a first extension coupled to the bed member at a first level and a second extension coupled to said axle assembly, said lever means being pivotally fixed to said frame member at a second level vertically displaced from said first level for rotation about a generally fore-and-aft axis and rotating said axle assembly relative to said frame member as a function of the rotation of the bed member relative to said frame member whereby said axle assembly is steered in response to turning of the trailer; a pair of flexible plates carried in said opposed pockets; and a spacer plate mounted on the other of the members and positioned between and in engagement with said flexible plates for springing said flexible plates apart.

10. In an automatic steering device for a vehicular trailer having a bed member, the combination of: a frame member for supporting the bed member of the trailer, said frame member being rotatable in a horizontal plane relative to the bed member; an axle assembly for supporting one end of frame member, said axle assembly being rotatable in a horizontal plane relative to said frame member; means carried by said frame member for supporting the other end of said frame member; lever means having a first extension coupled to the bed member at a first level and a second extension coupled to said axle assembly, said lever means being pivotally fixed to said frame member at a second level vertically displaced from said first level for rotation about a generally fore-and-aft axis and rotating said axle assembly relative to said frame member as a function of the rotation of the bed member relative to said frame member whereby said axle assembly is steered in response to turning of the trailer; a buffer plate mounted on one of the members, said buffer plate having a central depression with outwardly extending walls; an arm carried on the other of the members, said arm having an extending portion corresponding to said central depression and engageable with said walls thereof; variable pressure means coupled between said arm and said other member for urging said arm and plate into engagement; and control means for varying the pressure exerted by said pressure means as a function of a remote signal.

11. An automatic steering device as defined in claim 10 in which said variable pressure means includes a fluid pressure cylinder and a piston slidable therein.

12. In an automatic steering device for a vehicular trailer having a bed member, the combination of: a frame member for supporting the bed member of the trailer, said frame member being rotatable in a horizontal plane relative to the bed member; an axle assembly for supporting one end of said frame member, said axle assembly being rotatable in a horizontal plane relative to said frame member; means carried by said frame member for supporting the other end of said frame member; lever means having a first extension coupled to the bed member at a first level and a second extension coupled to said axle assembly, said lever means being pivotally fixed to said frame member at a second level vertically displaced from said first level for rotation about a generally fore-and-aft axis and rotating said axle assembly relative to said frame member as a function of the rotation of the bed member relative to said frame member whereby said axle assembly is steered in response to turning of the trailer; a buffer plate mounted on one of the members, said buffer plate having a central depression with outwardly extending walls; an arm carried on the other of the members, said arm having an extending portion corresponding to said central depression and engageable with said walls thereof; a first fluid pressure cylinder and piston unit coupled between said arm and said other member; a second fluid pressure cylinder and piston unit coupled between said arm and said other member; means for coupling a fluid under pressure to said first unit for urging said arm and plate into engagement; and means for coupling a fluid under pressure to said second unit for urging said arm and plate into engagement to vary the centering force tending to maintain said members in a predetermined angular relation.

References Cited in the file of this patent

UNITED STATES PATENTS

| | | |
|---|---|---|
| 1,666,921 | Warhus | Apr. 24, 1928 |
| 2,154,957 | Pinard | Apr. 18, 1939 |
| 2,312,646 | Hunt | Mar. 2, 1946 |
| 2,468,705 | Price | Apr. 26, 1949 |

FOREIGN PATENTS

| | | |
|---|---|---|
| 1,044,472 | France | June 17, 1953 |
| 921,250 | Germany | Dec. 13, 1954 |
| 723,978 | Great Britain | Feb. 16, 1955 |